United States Patent
Nakazawa et al.

(10) Patent No.: US 6,940,737 B2
(45) Date of Patent: *Sep. 6, 2005

(54) POWER SUPPLY CONTROL METHOD

(75) Inventors: Shigeaki Nakazawa, Fuchu (JP); Hidetoshi Yano, Inagi (JP); Hidekiyo Ozawa, Kawasaki (JP); Mitsuo Saeki, Nerima (JP); Kouichi Matsuda, Kawasaki (JP); Shigeo Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/464,642

(22) Filed: Jun. 19, 2003

(65) Prior Publication Data

US 2004/0105281 A1 Jun. 3, 2004

Related U.S. Application Data

(63) Continuation of application No. 09/946,378, filed on Sep. 6, 2001, now Pat. No. 6,639,812.

(30) Foreign Application Priority Data

Sep. 6, 2000 (JP) ........................................ 2000-270728

(51) Int. Cl.$^7$ ............................................. H02M 3/335
(52) U.S. Cl. ......................................................... 363/97
(58) Field of Search .......................... 363/21.01, 21.04, 363/21.07, 21.08, 21.09, 21.1, 21.11, 95, 97

(56) References Cited

U.S. PATENT DOCUMENTS

| | | | |
|---|---|---|---|
| 5,012,401 A | 4/1991 | Barlage | 363/97 |
| 5,132,606 A * | 7/1992 | Herbert | 323/266 |
| 5,408,401 A | 4/1995 | Miyazaki | 363/95 |
| 5,424,933 A | 6/1995 | Illingworth | 363/97 |
| 5,499,184 A | 3/1996 | Squibb | 363/95 |
| 5,854,742 A | 12/1998 | Faulk | 363/97 |
| 5,864,110 A * | 1/1999 | Moriguchi et al. | 219/121.57 |
| 6,088,244 A | 7/2000 | Shiya et al. | 363/97 |
| 6,639,812 B2 * | 10/2003 | Nakazawa et al. | 363/21.07 |

* cited by examiner

Primary Examiner—Jeffrey Sterrett
(74) Attorney, Agent, or Firm—Staas & Halsey LLP

(57) ABSTRACT

A power supply control circuit connectable with an input power monitor that monitors an input power value to the power supply, an output power monitor that monitors an output power value from the power supply, and an output power controller that varies the output power value from the power supply, the power supply control circuit having an output power determiner that determines a determined output power value depending on the input power value and a power adjuster that adjusts the output power value to the determined output power value by controlling the output power controller.

2 Claims, 14 Drawing Sheets

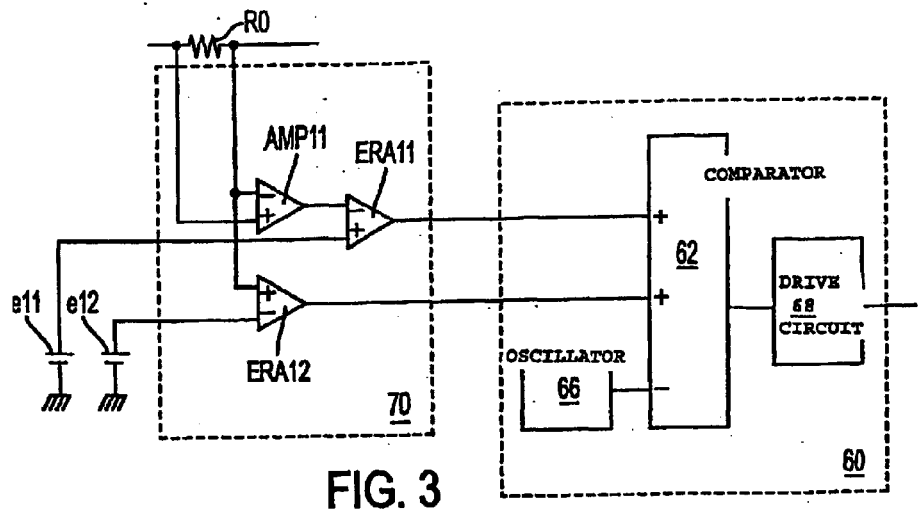
FIG. 3
(RELATED ART)
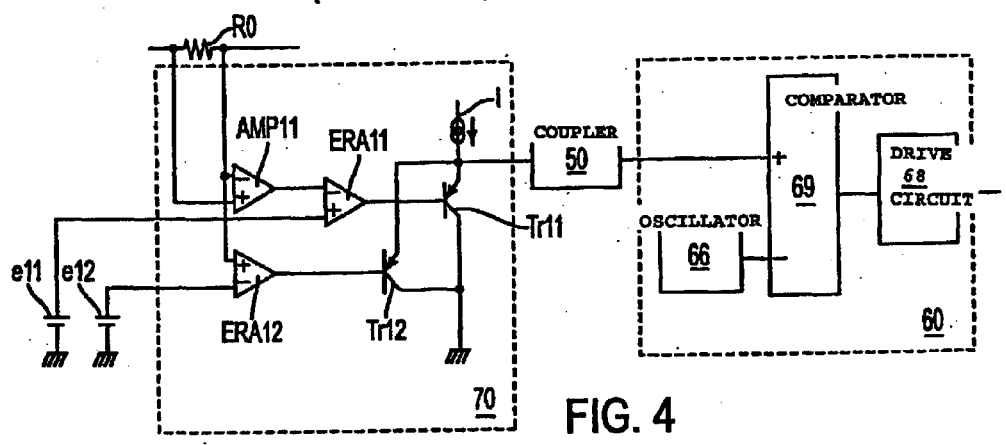
FIG. 4
(RELATED ART)
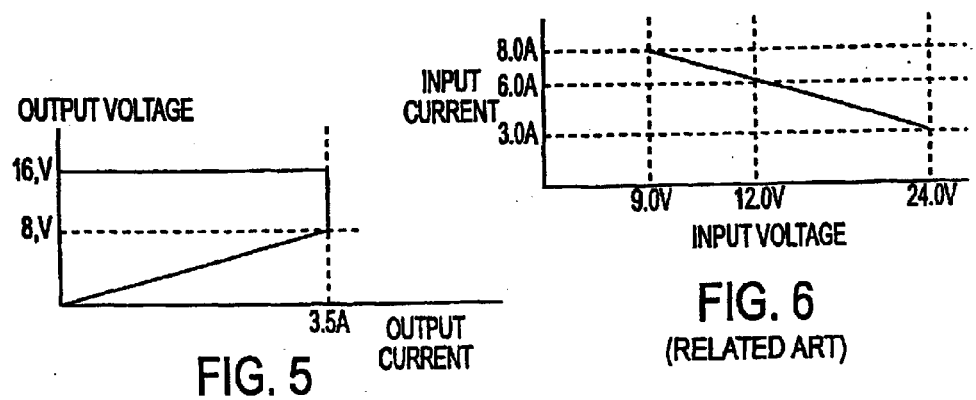
FIG. 5
(RELATED ART)
FIG. 6
(RELATED ART)

POWER SUPPLY CONTROL METHOD

CROSS REFERENCE TO RELATED APPLICATION

This application is a continuation of U.S. patent application Ser. No. 09/946,378, filed Sep. 6, 2001 U.S. pat. No. 6,639,812, and is based upon and claims priority of Japanese Patent Application No. 2000-270728 filed Sep. 6, 2000, and is the contents being incorporated herein by reference.

BACKGROUND OF THE INVENTION

1. Field of the Invention

The present invention relates to a power supply control circuit, power supply and power supply control method for converting an existing power supply at a first voltage and power rating to a secondary voltage and power rating.

2. Description of the Related Art

In a portable electronic device, such as a notebook size personal computer, an AC adapter or automobile battery adapter, etc. can be used for an external power supply. The automobile battery adapter is called a power supply. The power supply provides an output power by adjusting the power from the car battery to the power required for the portable electronic device.

The capacity of the power supply and the AC adapter generally determine the maximum output voltage and the maximum output current. This maximum output voltage and the maximum output current are defined as the rated output. The power supply always operates to compensate to the rated output even if the input power varies. Therefore, when an input voltage is high, an input current is small. On the other hand, when an input voltage is low, an input current becomes large.

FIG. 1 is a schematic diagram of a power supply circuit of the related art. The circuit includes a noise eliminating filter section 10, a voltage converting section 20 for converting an input power to an output power, a rectifying section 30 for rectifying an output of the secondary side, an output detecting section 40 for monitoring an output of the secondary side and a coupler 50 for transmitting the condition of an output detecting circuit in the secondary side to the voltage converting circuit in the primary side.

The filter section 10 is formed of a coil L1 and a capacitor C1. The filter section 10 is a circuit for preventing propagation of noise generated in the voltage converting section 20 to the input side.

The voltage converting section 20 includes a transformer T1 for voltage conversion, a transistor Tr1 for shutting off a current flowing through the transformer T1 and a control circuit 60 for controlling the transistor Tr1.

The rectifying section 30 includes a rectifying diode D1 for rectifying a current outputted from the voltage converting section 20 and a capacitor C2 for smoothing the rectified current.

The output detecting section 40 includes a sense resistor R0 for detecting an output current value of the power supply and a sense circuit 70 for detecting a voltage value across both ends of the sense resistor R0.

The coupler 50 is a circuit for transmitting an output of the sense circuit 70 to the control circuit 60. In the coupler 50, a photo-coupler is used in general to electrically insulate the primary side and secondary side.

In FIG. 1, when the transistor Tr1 is ON, an input current flows in the primary side coil of the transformer T1. When the transistor Tr1 is OFF, an output current flows in the secondary side of the transformer T1. The circuit explained above is defined as an RCC type switching regulator.

In the RCC type switching regulator, when an output voltage value is Vout, input voltage value is Vin, the ON time of transistor Tr1 is Ton and the OFF time of transistor Tr1 is Toff, the relationship is defined by $Vin \times Ton = Vout \times Toff$. However, when the number of turns of the primary coil of the transformer T1 is assumed to be identical to the number of turns of the secondary coil, this formula can be modified so that $Vout = (Vin \times Ton)/Toff$. Moreover, it can be modified by the period of ON/OFF of the transistor Tr1 replacing T, producing $Vout = (Vin \times Ton)/(T - Toff)$.

As indicated in the above formula, the input current can be adjusted by controlling the ON time of transistor Tr1 while the output voltage is kept constant. Thus, even when the load connected to the output terminal of the power supply varies, the value of Vout can be maintained constant using the feed-back control that controls the ON time of the transistor Tr1 by monitoring the output voltage Vout.

FIG. 2 is a schematic diagram of another power supply circuit of the related art. The circuit of FIG. 2 is different from the RCC type switching regulator in that the voltage converting and rectifying section 80 is formed by integrating the voltage converting section 20 and rectifying section 30 of FIG. 1. Rectifying section 80 is therefore provided in place of individually providing a voltage converting section and a rectifying section.

In FIG. 2, when the transistor Tr1 is ON, an input current flows through the primary side coil of the transformer T1. This causes the output current to flow through the secondary side coil of the transformer T1. This type of circuit is defined as a FORWARD type switching regulator.

In FIG. 2, the transformer T1 operates as a switch circuit. The transformer T1 does not operate as a voltage converting circuit. Therefore, a choke coil L2 and a flywheel diode D0 are required for voltage conversion in addition to the transformer T1. In the circuit of FIG. 2, the relationship of the voltage to the time the transformer T1 is ON is $Vout = (Vin \times Ton)/(Ton + Toff) = (Vin \times Ton)/T$.

In addition, the current flowing through L2 also flows in the output detecting section 40 and the noise eliminating filter section 10 while the transistor Tr1 is ON. Moreover, current flowing through L2 is supplied via D1 while the transistor Tr1 is OFF. Therefore, an average input current Iin to the power supply circuit becomes equal to a product of an output current Iout and the ON time of transistor Tr1. Accordingly, the relationship of current to the time transistor Tr1 is ON is $Iin = (Iout \times Ton)/T$.

As indicated in the above formula, controlling the ON time of the transistor Tr1 can cover variation of the input voltage. Moreover, even when the capacity of the load connected to the output of the power supply is varied, Vout can be maintained constant by having the feedback control vary the ON time of the transistor Tr1 in accordance with the output voltage Vout.

FIG. 3 is a schematic diagram illustrating details of the sense circuit 70 and control circuit 60 that monitor the output power in the circuit illustrated in FIG. 1 or FIG. 2. The sense circuit 70 includes a voltage amplifier AMP 11, a couple of error amplifiers ERA 11, ERA 12 and reference voltage sources e11, e12. The control circuit 60 includes a triangular wave oscillator 66, a PWM comparator 62 and a drive circuit 68.

The reference voltage source e11 is the reference voltage used to determine the output current value. The reference voltage source e12 is the reference voltage used to determine the output voltage value.

The voltage amplifier AMP11 measures a voltage drop generated by a current flowing through the sense resistor R0. The voltage amplifier AMP11 outputs a voltage that is proportional to a current value flowing through the sense resistor R0. The error amplifier ERA11 compares an output voltage value with the reference voltage value e11. The error amplifier ERA11 outputs a low level when a large current flows through the sense resistor RO or a high level when a small current flows through the sense resistor R0.

Similarly, the error amplifier ERA12 compares an output voltage value of the power supply with the reference voltage value e12. The error amplifier ERA12 outputs a low level when the power supply outputs a high output voltage value or a high level when the power supply outputs a low output voltage value.

The PWM comparator 62 is a voltage comparator including one inverting input and a plurality of non-inverting inputs. Namely, the PWM comparator 62 illustrated in FIG. 3 is a voltage pulse width converter for controlling the ON time of an output pulse depending on an input voltage value. The PWM comparator 62 compares the minimum voltage value among a plurality of non-inverting inputs shown by a +, with the voltage value of an inverting input shown by a −. The PWM comparator 62 provides an output when the voltage value of inverting input is lower. An output signal from the triangular wave oscillator 66 is inputted to the inverting input of the PWM comparator 62. Meanwhile, the output from the error amplifier ERA11 and the output from the ERA12 are inputted to the non-inverting input.

During the period where the triangular wave voltage value from the triangular wave oscillator 66 is lower than the output voltage of error amplifier ERA11 and is also lower than the output voltage value of the error amplifier ERA12, an output voltage from the PWM comparator 62 is inputted to the drive circuit 68. With this input, the drive circuit 68 is driven to drive the switching transistor Tr1 of the power supply. Moreover, during the period where the triangular wave voltage value from the triangular wave oscillator 66 is higher than the output voltage value of the error amplifier ERA11 or the triangular wave voltage value from the triangular wave oscillator 66 is higher than the output voltage value of the error amplifier ERA12, an output is not provided to the drive circuit 68 from the PWM comparator 62. Thereby, drive of the drive circuit 68 stops and the switching transistor Tr1 of the power supply turns OFF.

As explained above, the switching transistor Tr1 is turned OFF depending on the output voltage value of the power supply that is detected with the sense circuit 70. The power supply control circuit controls an output voltage and an output current of the power supply with the structure explained above.

In FIG. 3, an output from the sense circuit 70 for monitoring an output voltage and an output current is then inputted directly to the PWM circuit 62 of the control circuit 60. However, if electrical isolation is required between the sense circuit 70 and the control circuit 60, a photocoupler is connected to each input end of the PWM circuit 62. Such electrical isolation can also be realized by attaching a photocoupler to the output of the sense circuit 60.

In the circuit illustrated in FIG. 3, the PWM comparator 62 selects a lower voltage value among the outputs of the error amplifiers ERA11 and ERA12. However, it is also possible that the sensor circuit 60 combines the output voltages of the error amplifiers ERA11 and ERA12 and transmits only the lower voltage value.

FIG. 4 is a schematic diagram illustrating a circuit to realize such modification. The circuit illustrated here is an analog circuit to transmit the lower voltage value among the outputs of the error amplifiers ERA11 and ERA12. When a voltage of the error amplifier ERA11 becomes high, the base potential of the transistor Tr11 becomes high and a base current is reduced. Therefore, a collector resistance of Tr11 becomes high and a constant current is supplied to the collector of Tr1 from the constant current source i. Therefore, the collector voltage of Tr11 becomes higher as the collector resistance of Tr11 becomes large.

When the voltage of error amplifier ERA11 becomes low, a base potential of Tr11 becomes low. Therefore, since a base current increases, a collector resistance of Tr11 becomes small. Since a constant current is supplied to the collector of Tr11 from the constant current source i, a collector voltage of Tr11 becomes low in proportion to reduction of the collector resistor of Tr11.

Similarly, when a voltage of the error amplifier ERA 12 becomes high, a base potential of Tr12 becomes high. Thereby, since a base current is reduced, a collector resistance of Tr12 becomes large. A constant current is supplied to the collector of Tr12 from the constant current source i. Accordingly, a collector voltage of Tr12 becomes high in proportion to increase of collector resistance of Tr12.

When a voltage of the error amplifier ERA12 becomes lower, a base potential of Tr12 becomes low. If so, since a base current increases, a collector resistance of Tr12 becomes small. Since a constant current is supplied to the collector of Tr12 from the constant current source i, a collector voltage of Tr12 becomes low in proportion to reduction of collector resistance of Tr12.

The collectors of Tr11 and Tr12 are connected to the common constant current source i. Therefore, the collector voltage of Tr11 and Tr12 is fixed to the lower voltage. Accordingly, a lower voltage of the output voltage of error amplifier ERA11 or the output voltage of error amplifier ERA12 is outputted as the collector voltage of Tr11 and Tr12.

FIG. 7 is a structural diagram illustrating a related art external power supply that is connected to an electronic device with the power supply. In this figure, a docking station 130 is connected as a new load between the external power supply 100 and electronic device 110.

In FIG. 7, the power inputted from the external power supply 100 is supplied as the power source of the electronic device 110. Moreover, when a secondary battery 111 is provided within the electronic device 110, such power is also supplied as the charging power of the secondary battery 111. The power supplied to the electronic device 110 is converted to the voltage value required by the device with a voltage converting circuit 112.

The secondary battery 111 is a built-in battery to supply the power to the electronic device 110 when the power source from the external power supply 110 stops. Power supply 150 applies the power to charge the secondary battery 111 built in the electronic device. A microcomputer 113 detects start and end of charging at the time of charging the secondary battery 111. The microcomputer 113 controls the ON/OFF condition of the power supply from a charger and also controls the power supply.

Voltage comparator COMP101 detects that the power is supplied from the external power supply. COMP101 sends a high level to the microcomputer when a voltage value measured with voltage dividing resistors R103 and R104 is higher than reference voltage value e1. AMP101 measures a current value supplied to the secondary battery 111 from the power supply 150. A diode D101 prevents leak of power of the secondary battery 111 to the external circuit. A diode D102 prevents direct application of the power from the external power supply to the secondary battery 111 when the power is supplied from the external power supply.

The power supply 150 is a DC-DC converter to generate a constant voltage or a constant current or a constant voltage current. The power supply 150 includes a sense resistor R101 for measuring an input current value from the external power supply, a sense resistor R102 for measuring a charting current value of the secondary battery 111, a main switch transistor FET101, a choke coil L101, a flywheel diode D103, a smoothing capacitor C101 and a control circuit. Detailed operation of the power supply 150 is not explained here, because it is similar to the operation explained above.

The docking station 130 is provided to expand the functions of the electronic device 110. This docking station 130 can expand the functions of the electronic device through connection with the electronic device. Portability is a very important factor in the portable type information device, such as a notebook size personal computer.

Therefore, the basic section of the notebook size personal computer must be given the required minimum functions through reduction in size and weight as much as possible. For this reason, the LAN connecting mechanism which cannot be used during the transportation and CD drive or DVD drive which is not used frequently are no longer loaded to the body of notebook size personal computer. Meanwhile, it is very convenient when various functions are provided in the notebook size personal computer for when it is used on the desk. Therefore, the docking station is provided with high level functions. Connecting a notebook size personal computer to the docking station can attain expandability for use of various devices.

In FIG. 7, the external power supply 100 sends the power to both electronic device 110 and docking station 130. When the secondary battery 111 is charged in the side of electronic device 110, the power supply 150 tries to extract the maximum current specified at the time of design from the external power supply 100. However, the power of external power supply 100 is also supplied to the docking station 130. Accordingly, the external power supply 100 enters the over-load condition and thereby shuts off the output.

Therefore, the external power supply 100 for docking station 130 shall have the capacity to cover the addition of the maximum current used for the docking station 130 to the power consumption of the electronic device 110.

However, in this case, if a load current, for example, of the docking station 130 is reduced depending on the operating condition, an extra power cannot be used as the charging power of the secondary battery in the side of electronic device 110.

As a method of overcoming such problem, there is proposed a charging control circuit (Japanese Published Unexamined Patent Application No. HEI 10-286586) for keeping constant the output voltage of external power supply and controlling the charging current by monitoring an output voltage value of the external power supply. However, this circuit cannot attain the result as expected when an output power value of external power supply does not conform to the theoretical value.

SUMMARY OF THE INVENTION

First, in accordance with the present invention, a power supply can attain a maximum output while preventing damage to an external power supply even when the external power supply needs to provide varying output voltage. Therefore, additional output can be provided for portable electronic terminals. Thus, the exemplary embodiments as noted herein help solve the tendency to increase power consumption. In addition, it is possible to provide a means for safely and efficiently consuming additional power when a new load is connected between the external power supply and the power supply.

For example, FIG. 15 shows that the exemplary external power supply drops the input voltage and increases the input current when overloaded and protects its output current as much as possible when overloaded. However, a power supply of lower reliability shown in FIG. 18 lowers the voltage when overloaded but sometimes provides an excessive output power. If this condition is continued for a long time, the external power supply will probably over-heat.

One exemplary embodiment is provided with a mechanism to monitor the input power value (input voltage and input current) of the charger and therefore it can determine, if the external power supply cannot supply the charging power to the receiving device, whether the cause is a limitation in the input current or in the input voltage. Therefore, the exemplary power supply does not become overloaded and can optimize the charging condition.

Moreover, it is possible to avoid erroneous recognition for the end of charging because of insufficient input power, even when a lithium ion (Li+) battery is used to complete the charging when the charging current value becomes the predetermined constant value or less.

The principles of the present invention have been explained above with an example of a car battery adapter in view of easily helping the understanding of the present invention. It is obvious that the present invention is useful not only for the car battery adapter but for many other similar power supply devices. The present invention can be used in any power supply circuit to convert an input voltage from a external power supply to a predetermined power. The present invention has particular effect in a condition where the voltage of external power supply is unstable. For example, in a certain region, the present invention can provide sufficient effect on the adapter connected to the commercial power supply.

Moreover, other exemplary embodiments can be used as the charging circuit for the battery within an electronic device and can provide the increased current for portable type electronic devices, assuring portability and sophisticated functions. For example, the present invention can provide sufficient effect to the portable type terminal that is used in connection with the so-called docking station and is also used, when it is carried, by separating only the body provided with the required minimum functions from the docking station.

FIG. 5 illustrates an output characteristic of the power supply illustrated in FIG. 1. The rated output of this adapter is 16 volts/3.5 amperes. The output voltage of 16 volts is adjusted with the reference voltage e12 of the sense circuit 60. An output current of 3.5 amperes is adjusted with the reference voltage e11 of the sense circuit 60.

Here, it is assumed that a load connected to this adapter overloads its capacity by requiring an output current of 3.5 amperes or more. Even in such a case, the rated output of the adapter is 16 volts/3.5 amperes and therefore the output current of this adapter should not exceed 3.5 amperes under normal conditions.

FIG. 6 illustrates the relationship between an input current and an input voltage of an ideal power supply. Here, the voltage conversion efficiency of the power supply is assumed as 80%. This figure indicates the input current value and input voltage value when the rated output of 3.5 amperes is provided. When a battery voltage of a car is 12 volts or higher, the input current is 6.0 amperes or less. However, when the battery voltage of a car is lowered to 9 volts or less, the input current becomes 8.0 amperes.

When the related art power supply is connected to the car battery, such as through an automobile battery adapter, it is generally connected to the terminal of a cigarette lighter of a car. In the receptacle circuit of the cigarette lighter, a fuse of about 10 A is inserted to prevent short-circuiting the battery. When a fuse is used in the rated condition, it is known that the fuse blows usually after two hours. In order to prevent blow-out of the fuse, a current flowing through the fuse must be set 80% or less of the rated current. Therefore, when a related art power supply as shown in FIG. 1 is used, it is required to set the current input to the related art power supply to 8 amperes or less.

Moreover, it is also required to insert a protection fuse within the automobile battery adapter itself in order to avoid blow-out of the car fuse due to a short-circuit of the power supply. Namely, even when a short-circuit internal to the power supply is generated, the fuse within the power supply must blow out before the fuse of an automobile. Thus, most power supply adapters for use in automobiles use a fuse rated at 8 amperes.

However, as explained above, the fuse generally blows out after two hours when the current flows in its rated capacity. Therefore, it is required to limit an input current of the automobile battery adapter to 6 A in order to provide adequate safety when the automobile adapter is used continuously.

On the other hand, when the performance of car battery is deteriorated or charging is insufficient, the output voltage of the battery is reduced, in some cases to 9 volts or less. The voltage value of about 9 volts is used because it is near to the limit value of the voltage required to start the engine.

Therefore, using the worst case, an input power to be inputted to the power supply becomes 9V/6 A (6 A×9V=54 watts (W)). When the conversion efficiency of automobile battery adapter is assumed as the ordinary value of 80%, an output voltage from the automobile battery adapter becomes equal to 54 W×0.8=43.2 W.

In recent years, power consumption by electronic devices has increased. For example, an exemplary hand-held terminal requires the occasional input of 70 W. Therefore, the automobile battery adapter that can output only the power of about 43 W or so has insufficient capacity. When the device therefore attempts to draw sufficient current to operate, an input current of the power supply increases and thereby blows-out the fuse.

The automobile battery adapter has been explained above as a simple example, but an additional exemplary problem lies in generating damage to the electric circuits due to excessive input current as well as in the automobile battery adapter in the environment that the input power becomes unstable.

In exemplary embodiments of the present invention as will be described below, a structure for monitoring an input power value to the power supply is added to the structure of the power supply control circuit of the related art. Thereby, it is possible to control the input current to a value lower than the fuse value without adjusting for variation of input voltage in the power supply control circuit. Therefore, the exemplary power supply using a power supply control circuit in accordance with the present invention can prevent over current being outputted to an external power supply.

Moreover, exemplary embodiments of the present invention as will be described below provide a power supply which outputs the rated power when an input voltage is normal. However, when an input voltage from the external power supply is low, the power outputted from the power supply is reduced. Therefore, the power supply can control an excessive current input from the external power supply.

Moreover, exemplary embodiments of the present invention as will be described below provide a power supply control circuit, which can output the rated power of the fuse for a constant period and thereafter reduce the output power when the input voltage from the external power supply is low. Therefore, the exemplary power supply using the power supply control circuit of the present invention can control input of excessive current from the external power supply. Moreover, even when a new load is connected between the external power supply and hand-held mobile terminal, the external power can be used effectively.

In order to achieve various advantages as noted and in accordance with embodiments of the present invention, there is provided a power supply control circuit connectable with an input power monitor that monitors an input power value to the power supply, an output power monitor that monitors an output power value from the power supply, an output power controller that varies the output power value from the power supply and a power supply control circuit connected to the input power monitor, the output power monitor and the output power controller, the power supply control circuit having an output power determiner that determines a determined output power value depending on the input power value and a power adjuster that adjusts the output power value to the determined output power value by controlling the output power controller.

As embodied herein, this circuit preferably has a first timer that measures passage of a first time a second timer that measures passage of a second time after the first timer measures the first time and an output power switch that instructs the first value to the output power determining section while the first timer measures passage of the first time, and instructs the second value to the output power determining section while the second timer measures passage of the second time.

In accordance with further embodiments of the present invention, there is provided a power supply, having an input power monitor that monitors an input power value, an output power monitor that monitors an output power value an output power controller that varies the output power value by controlling an input current value an output power determiner that determines a determined output power value depending on the input power value notified from the input power monitor and a power adjuster that maintains the output power value notified from the output power monitor as the determined output power by controlling the output power controller.

As embodied herein, this circuit preferably has a first timer that measures passage of a first time a second timer that measures passage of a second time after the first timer measures the first time and an output power switch that instructs the first value to the output power determining section while the first timer measures passage of the first time, and instructs the second value to the output power determining section while the second timer measures passage of the second time.

In accordance with further embodiments of the present invention, there is provided a power supply control method that includes outputting a first output power value in which an input current value becomes a first value for a first time period by controlling the input current value so that an output power is maintained as the first output power value and outputting a second output power value that is smaller than the first output power value for a second time period by controlling the input current value so that the output power is maintained as the second output power value.

In accordance with further embodiments of the present invention, there is provided an output power controller having an output power determiner that determines a determined output power value depending on an input power value and a power adjuster that adjusts the output power value to the determined output power value by controlling an input current value.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 3 is a structural diagram illustrating a related art power supply control circuit;

FIG. 4 is a structural diagram illustrating another related art power supply control circuit;

FIG. 5 is a graph illustrating input characteristics of a related art power supply;

FIG. 6 is a graph illustrating output characteristics of an ideal power supply;

DETAILED DESCRIPTION OF THE PREFERRED EMBODIMENTS

Figure 1:
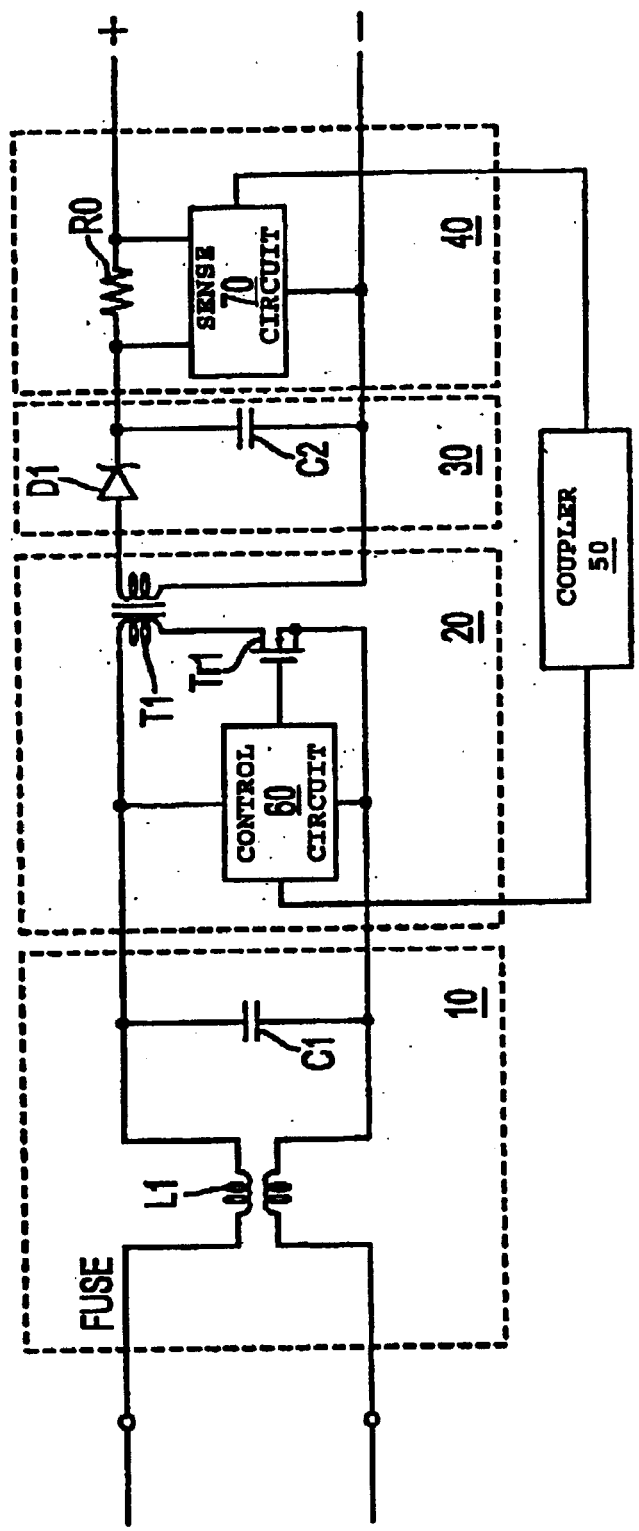
FIG. 1 is a structural diagram illustrating a related art power supply.
Figure 2:
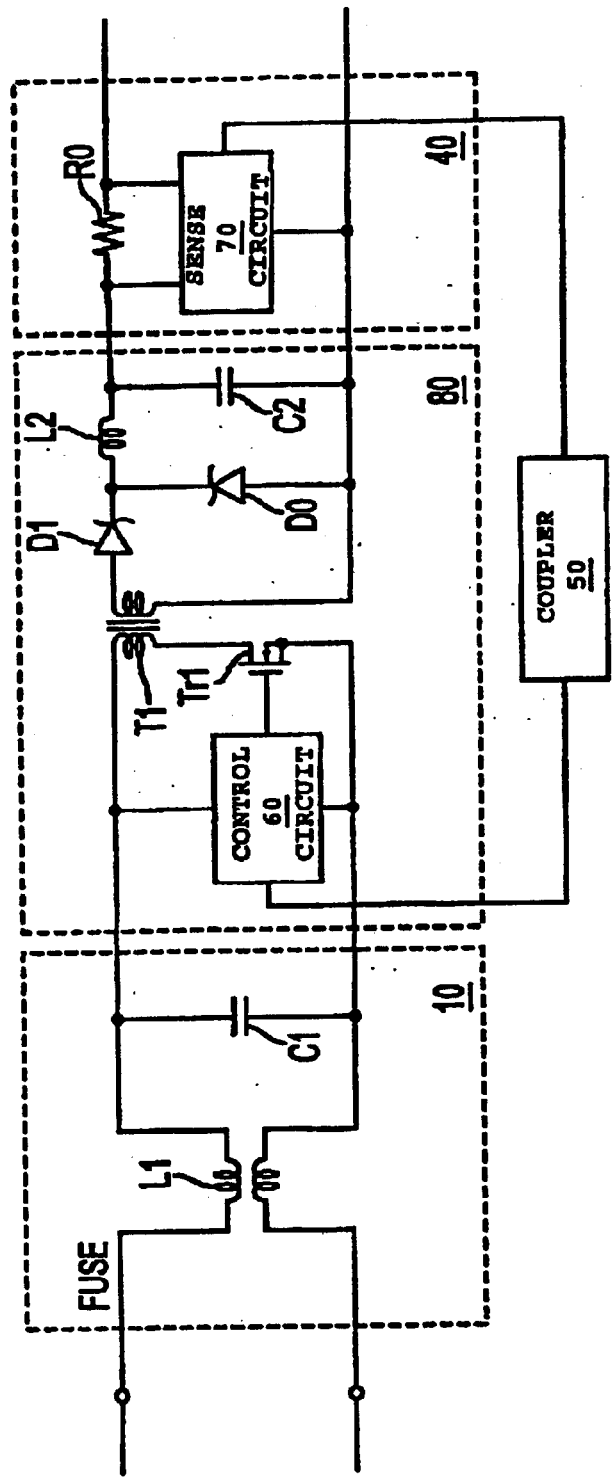
FIG. 2 is a structural diagram illustrating another related art power supply.

Reference will now be made in detail to the preferred embodiments of the present invention, examples of which are illustrated in the accompanying drawings, wherein like reference numerals refer to like elements throughout.

Figure 8:
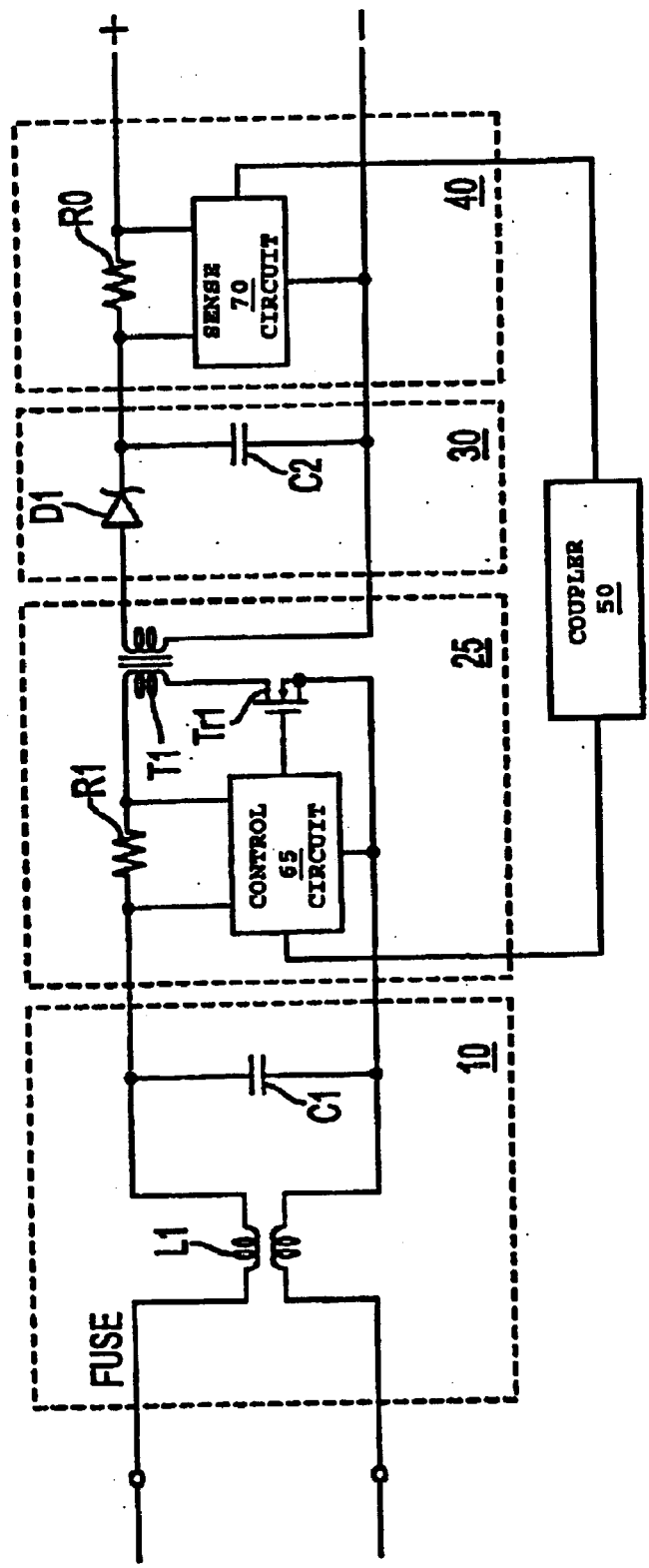
FIG. 8 is a structural diagram illustrating a power supply in accordance with an embodiment of the present invention.

FIG. 8 illustrates a first exemplary embodiment of a power supply circuit in accordance with the present invention. Voltage converting section 25 of the first exemplary power supply circuit is different from the circuit of the related art. In the first exemplary power supply, a current sense resistor R1 measures an input current value that is added to the related art power supply. Both ends of sense resistor R1 are connected to a control circuit 65. Similar elements are designated with the same reference numerals of FIG. 1 and operate in a similar same manner are not explained here.

Figure 9:
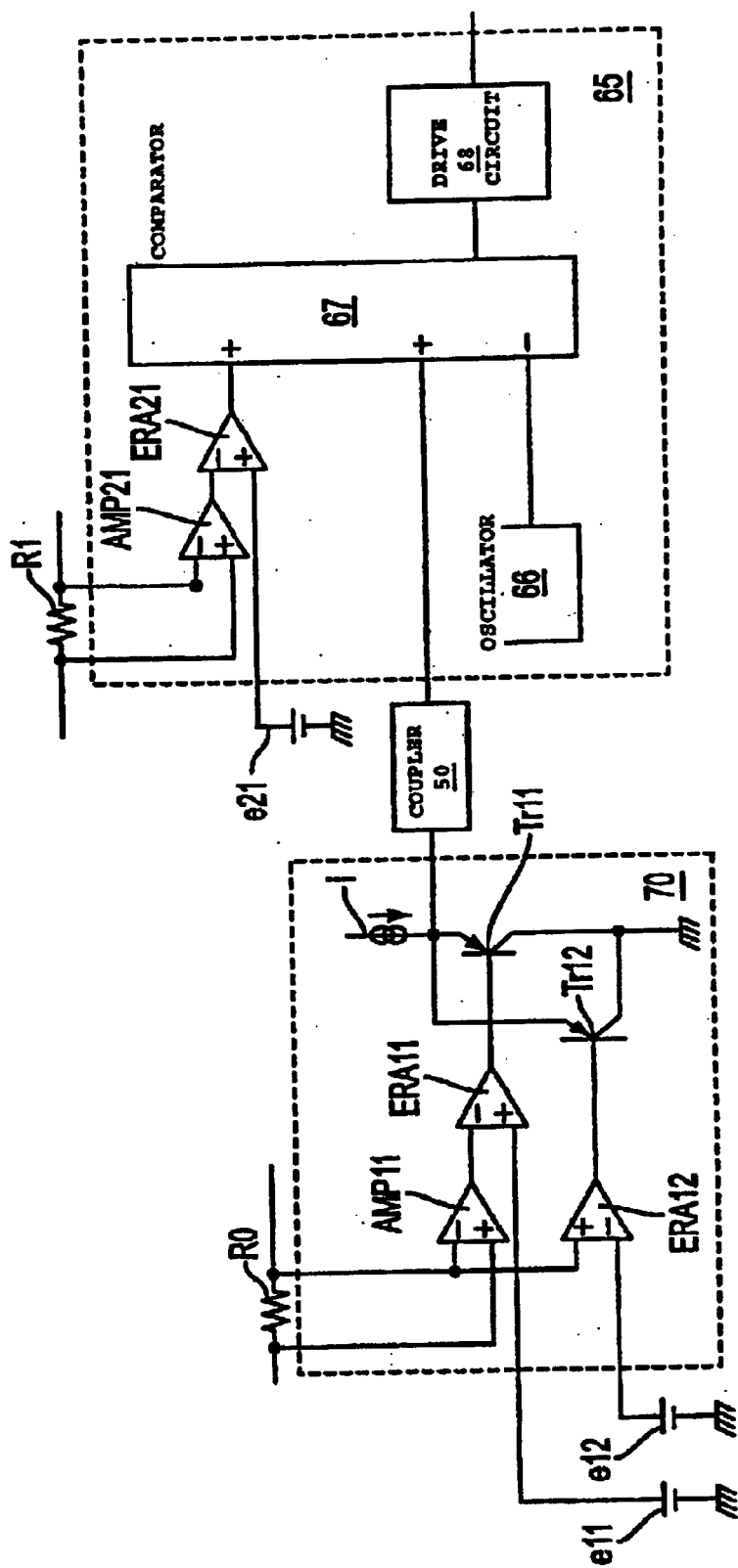
FIG. 9 is a diagram illustrating a power supply control circuit in accordance with an embodiment of the present invention.

FIG. 9 illustrates details of the sense circuit 70 of the output detecting section 40 and the control circuit 65 of the voltage converting section 25. Explanation of the part of sense circuit 70 of FIG. 9 that is similar to that in the related art is omitted here.

In the control circuit 65 of FIG. 9, e21 is the reference voltage used to determine an input current value. AMP21 measures a voltage drop generated by a current flowing through the current sense resistor R1. AMP21 outputs a voltage in proportion to a current value following through the sense resistor R1. ERA21 compares an output voltage value of the voltage amplifier AMP 11 with the reference voltage value e21. When a current flowing through the sense resistor R21 is high, the error amplifier ERA21 outputs a low level signal. When the current flowing through the sense resistor R1 is small, the error amplifier ERA21 outputs a high level signal.

An output of ERA21 is impressed to the non-inverting input of the PWM comparator 67. Therefore, during the period where a triangular wave voltage value outputted from the triangular wave oscillator 66 is lower than any output voltage value of the error amplifier ERA21 and sense circuit 70, the drive circuit 68 is driven. Thereby, the switching transistor Tr1 (FIG. 8) turns ON. Moreover, during the period where the triangular wave voltage value from the triangular wave oscillator is higher than any one of the output voltage value of the sense circuit 70 and error amplifier ERA21, the drive circuit 68 is driven. Thereby, the switching transistor Tr1 (FIG. 8) turns OFF.

Figure 15:
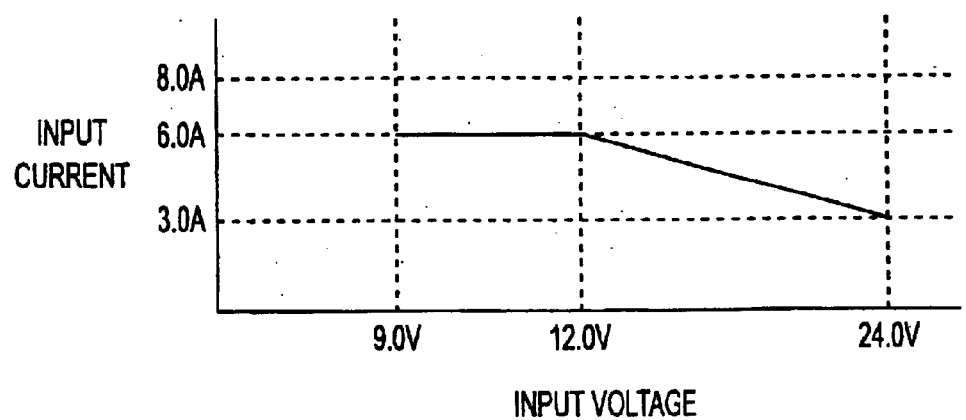
FIG. 15 is a graph illustrating output characteristics of a power supply in accordance with an embodiment of the present invention.

FIG. 15 illustrates how in the first exemplary power supply, even if an input voltage to the power supply is lowered, the output current value never exceeds the predetermined constant value. Therefore, the first exemplary power supply can prevent breakdown of the circuit due to over-current conditions.

Figure 13:
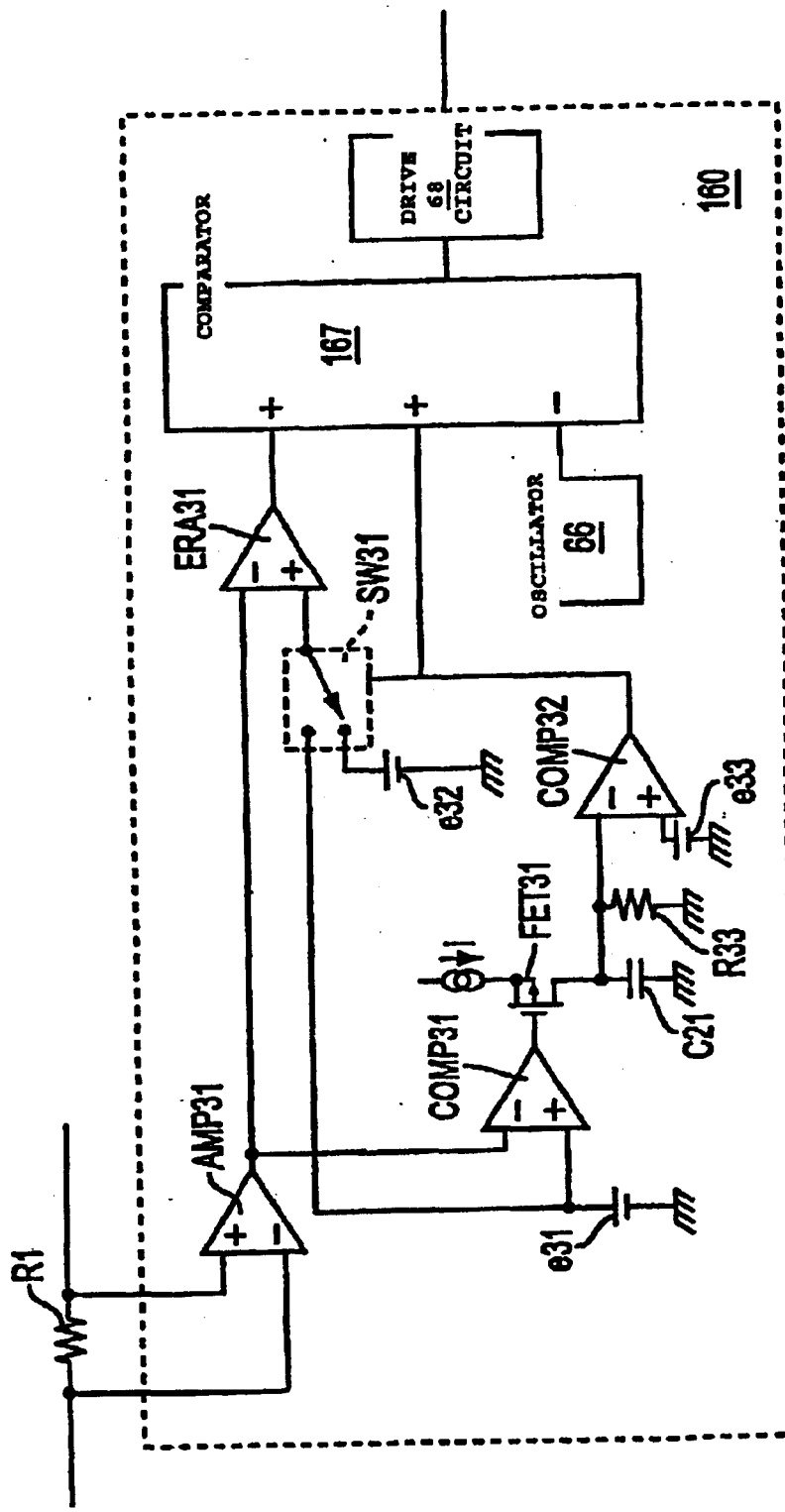
FIG. 13 is a diagram illustrating a power supply control circuit used in a power supply in accordance with an embodiment of the present invention.

FIG. 13 illustrates a second exemplary embodiment of a power supply circuit in accordance with the present invention. The second exemplary embodiment is capable of outputting the rated voltage and current when the input voltage value is higher and the input current value is equal to the specified value or less. However, when the input voltage value to the power supply is low and the input current value becomes equal to the specified value or more, an output current is lowered.

Even though the second exemplary embodiment does not protect the output power, it is still effective. Not all devices require full power all the time. In addition, in other devices, reduced power for short periods of time does not negatively impact operation. In addition, protecting the input power is advantageous given the additional power possible because of the properties of the fuse as noted above.

The power supply circuit illustrated in FIG. 9 measures a voltage drop generated with a current flowing through the resistor R1 and thereby controls an output by utilizing a current sense resistor R1. The power supply circuit illustrated in FIG. 10 illustrates a structure to control the output by measuring an input voltage value in place of the power supply circuit explained above.

Figure 10:
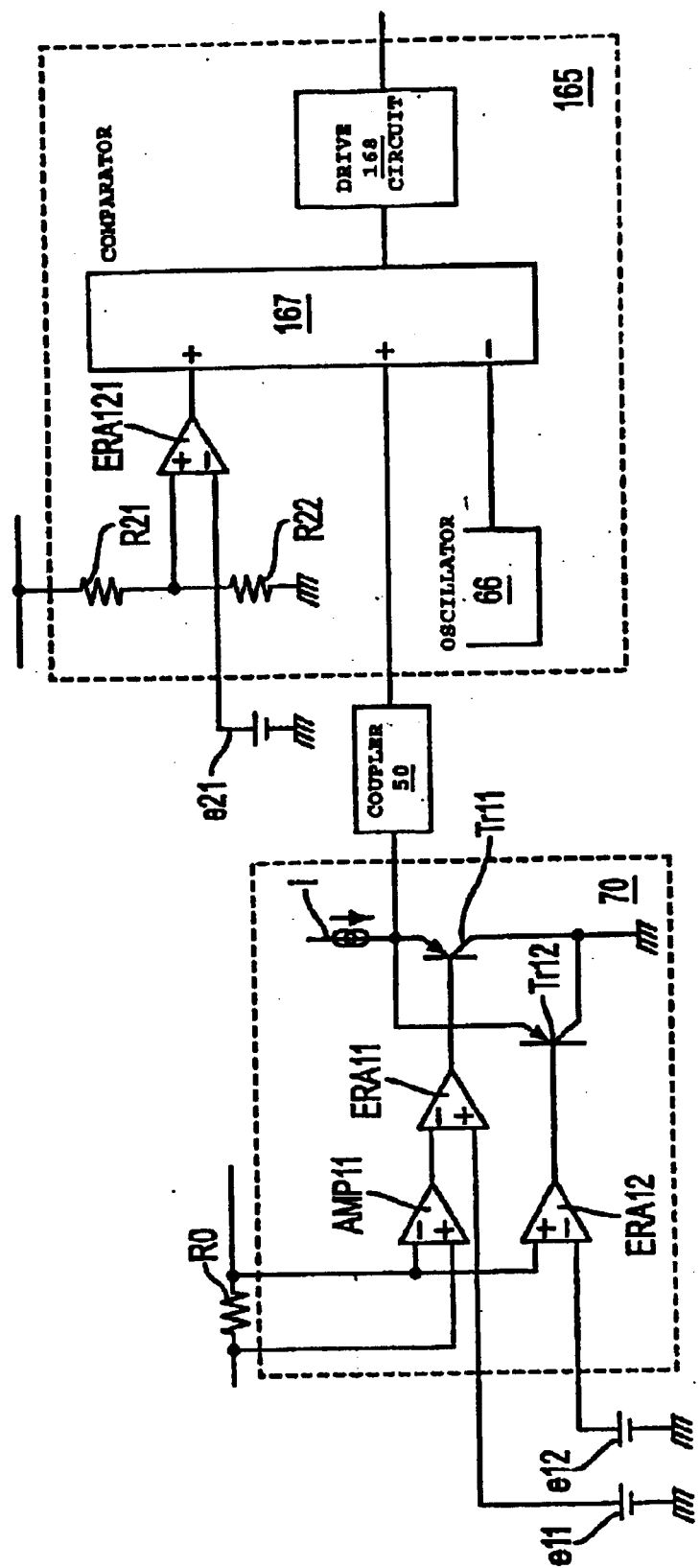
FIG. 10 is a diagram illustrating a power supply control circuit in accordance with an embodiment of the present invention.

In the power supply control circuit 165 of FIG. 10, the voltage dividing resistors R21 and R22 for measuring input voltage are provided in place of the current sense resistor R21 and voltage amplifier AMP21. An output of the voltage dividing resistor R21 is inputted to the error amplifier ERA121. Thereby, an output of the voltage dividing resistor R21 is compared with the reference voltage value e21. A voltage is outputted from the error amplifier ERA121 depending on the output voltage value of the voltage dividing resistor R21.

When the input voltage value measured with the voltage dividing resistor sense resistors R21 and R22 is high, the error amplifier ERA121 outputs a high level signal. When the input voltage value measured with the voltage dividing resistor sense resistors R21 and R22 is low, the error amplifier ERA121 outputs a low level signal.

An output of ERA121 is applied to the non-inverting input of the PWM comparator 167. Therefore, the drive circuit 168 is driven during the period where the triangular wave voltage value from the triangular wave oscillator 169 is lower than the output voltage value from the sense circuit 70 and is lower than the output voltage value from the error amplifier ERA121. Thereby, the switching transistor Tr1 turns ON. Moreover, the drive of the drive circuit 168 is stopped during the period where the triangular wave voltage value from the triangular wave oscillator 169 is higher than the output voltage value from the sense circuit 70 or the triangular wave voltage value is higher than the output voltage value of the error amplifier ERA121. Thereby, the switching transistor Tr1 turns OFF.

Figure 14:
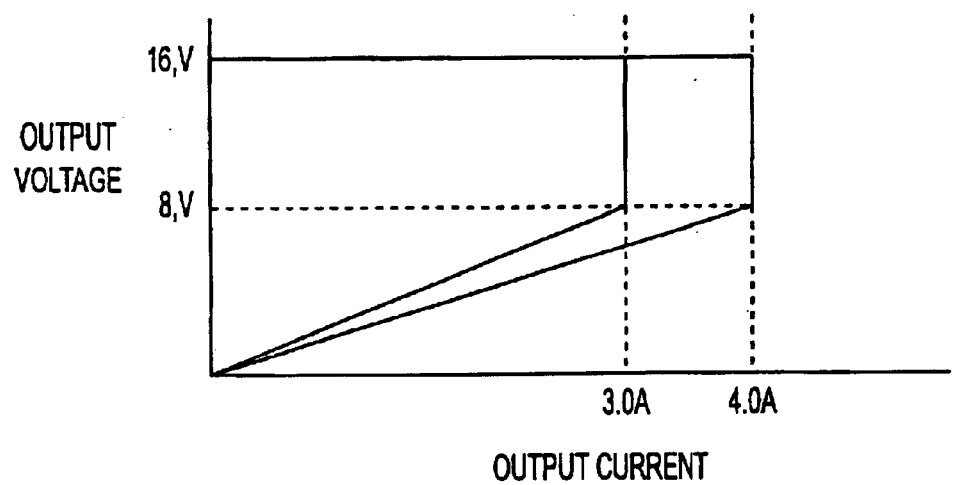
FIG. 14 is a graph illustrating input characteristics of a power supply in accordance with an embodiment of the present invention.

FIG. 14 shows characteristics of the fuse located prior to the above exemplary power supply circuit. As is already explained above, it is known that the fuse is generally blown out after two hours when it is used under the rated current condition. Therefore, it is designed, that a current exceeding 80% of the rated current does not flow into the fuse. However, in accordance with the present invention, the following information has been obtained as a result of detailed investigation of the characteristics of fuses.

Namely, a current of 8 amperes is applied continuously for 54 minutes to the fuse having the rated power of 8 amperes. Thereafter, a current of 6 amperes is applied for six minutes to such fuse. When such control is repeated, the fuse has not blown out even after the continuous operation of 1000 hours. Moreover, there are no changes observed in the resistance value of the fuse itself.

In other words, blow-out of the fuse can be prevented indefinitely by keeping, during continuous operation, the power level at the rated capacity for 90% of the operational time and also keeping the power level at 80% of rated capacity for 10% or more of the operational time.

Figure 11:
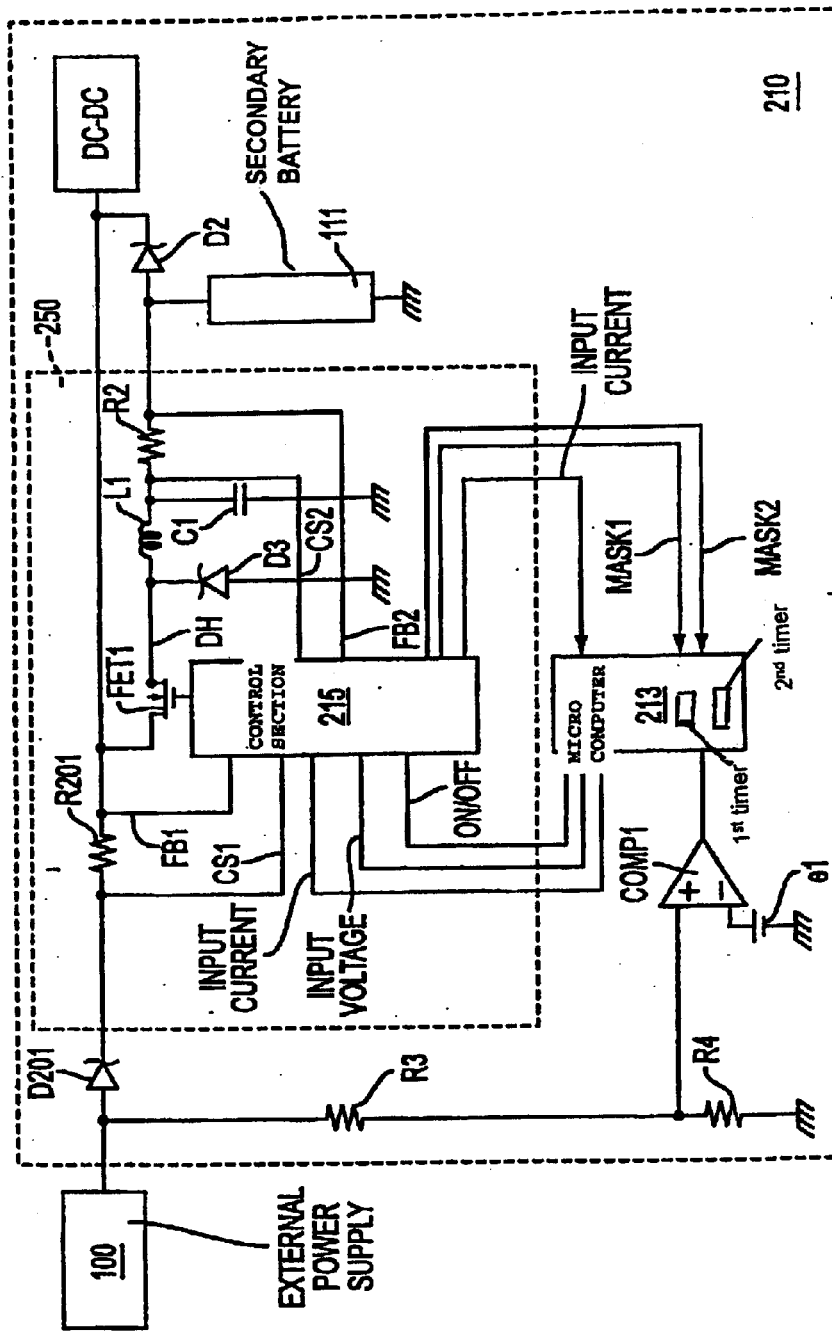
FIG. 11 is a diagram illustrating a power supply in accordance with an embodiment of the present invention.

FIG. 11 is an exemplary embodiment of a power supply in accordance with the invention based on the result explained above. The power supply comprising this power supply circuit is also provided with a 8 ampere-fuse in order to keep the input current from the battery within 8 ampere. However, since it is possible to apply the current of 8 ampere for the time of 90% of the usage time, an output of 72 W can be attained during this period. Accordingly, this power supply can realize connection of a variety of electronic devices, such as a hand-held information terminals, requiring large consumption of power that will be used in the near future.

In FIG. 11, the voltage amplifier AMP21, error amplifier ERA21 and PWM comparator 67, etc. are similar to those of the power supply circuit illustrated in FIG. 8 and operate in a similar manner.

In the power supply circuit of FIG. 8, a kind of reference voltage value of the error amplifier ERA21 is used for controlling an input current. However, in the circuit of the power supply of FIG. 11, two kinds of voltages, e31 and e32, are switched with the switch circuit SW31. Therefore, the current value inputted to the power supply may be maintained at any one of two values. As these two kinds of current values, the voltage value e31, for example, keeps the input voltage to 6 amperes, while the voltage value e32 keeps the input voltage to 8 amperes.

The voltage comparator COMP31 detects that a current flowing into the current sense resistor R1 is higher than the value corresponding to the first reference voltage value e31. The voltage comparator COMP31 outputs a high level when the input current value is higher than the value corresponding to the first reference voltage value. The voltage comparator COMP31 outputs a low level when the input current value is lower than the value corresponding to the first reference voltage value.

FET31 is a switch circuit that is controlled for ON and OFF with an output of the voltage comparator COMP31. Variable i designates a constant current source to charge a capacitor C31. A resistor R33 is a discharging resistor for discharging the capacitor C31. The voltage comparator COMP32 compares a voltage value of the capacitor C31 with the reference voltage value e33.

The voltage comparator COMP32 outputs a high level when the voltage value of C31 is higher than the reference voltage value e33. An output from the voltage comparator COMP32 causes the error amplifier ERA31 to select the reference voltage value e31 via the switch SW31. When the voltage value of C31 is lower than the reference voltage e33, the voltage comparator COMP22 outputs a low level signal. An output of the voltage comparator COMP32 causes the error amplifier 31 to select the reference voltage value e32 via the switch SW31.

In the power supply circuit of FIG. 13, when an input current value to the power supply is lower than the value corresponding to the first reference voltage value e31, the voltage comparator COMP31 continuously outputs a low level signal. Therefore, the voltage value of capacitor C31 is kept low. Accordingly, the voltage comparator COMP32 continuously outputs a low level signal. After all, the reference voltage value of the error amplifier ERA31 is set to the second reference voltage value e32. An input current to the power supply is allowed to have the value corresponding to the second reference voltage value.

When an input current to the power supply increases and exceeds the current value corresponding to the first reference voltage value e31, the voltage comparator COMP31 outputs a high level. An output of the voltage COMP31 charges the capacitor C31 by turning ON FET31. The capacitor C31 is charged only when the input current value of the power supply is higher than the current value corresponding to the first reference value. When the input current value of the power supply is lower than the current value corresponding to the first reference value, the capacitor C31 is never charged.

A voltage value of the capacitor C31 rises therefore in proportion to the time where the input current value of the power supply is higher than the current value corresponding to the first reference voltage value. The voltage comparator COMP32 compares the voltage value of capacitor C31 with the reference voltage value e33. Therefore, when the total sum of the time where the input current value to the power supply is higher than the current value corresponding to the first reference voltage value becomes longer than the time designated with the reference voltage value e33, the voltage comparator COMP32 outputs a high level. An output of the voltage comparator COMP32 sets the reference voltage value of the error amplifier ERA31 to the first reference voltage value e31. Since the reference voltage value of the error amplifier ERA31 is varied to the first reference voltage value, an input current of the car adapter is limited to the value lower than the current value corresponding to the first reference voltage value.

While the voltage value of capacitor C31 is higher than the reference voltage value e33, the voltage comparator COMP32 continuously outputs a high level. However, the voltage value of output capacitor C31 is discharged via a discharging resistor R33. Therefore, after the constant time determined with the capacitance value of the capacitor C31 and a value of the discharging resistor R33, the voltage value of capacitor C31 becomes lower than the reference voltage value e33. The voltage comparator COMP32 outputs a low level to set the reference voltage value of the error amplifier ERA31 to the second reference voltage value e32.

In the above explanation, the control circuit selectively uses two kinds of current value for simplifying the explanation. However, in actual use, these current values may be continuously varied between these two kinds of values. In this case, it is required to set in more detail the relationship between the current value and passage of time. For this purpose, the power supply circuit may be structured by combining a known power supply circuit structure with a power supply circuit in accordance with the present invention. In any case, when the current flows continuously to the fuse at the rated capacity for a maximum period of 108 minutes (90% of two hours) and the current flowing in the fuse is set to 80% of the rated capacity for the remaining 12 minutes of two hours.

It is preferable that the time when the current of the rated capacity flows into the fuse is set to the period within 54 minutes (90% of an hour) and the current flowing into the fuse is set to 80% of the rated capacity for the remaining six minutes of an hour. Thus, even when the power supply has been designed as explained above, assuming previously an output value of the external power supply, it is also possible to connect another load between the external power supply and power supply.

FIG. 11 is a circuit diagram illustrating the second exemplary embodiment of the present invention in such a case that a new load is connected between the external power supply and the portable type electronic device.

Figure 7:
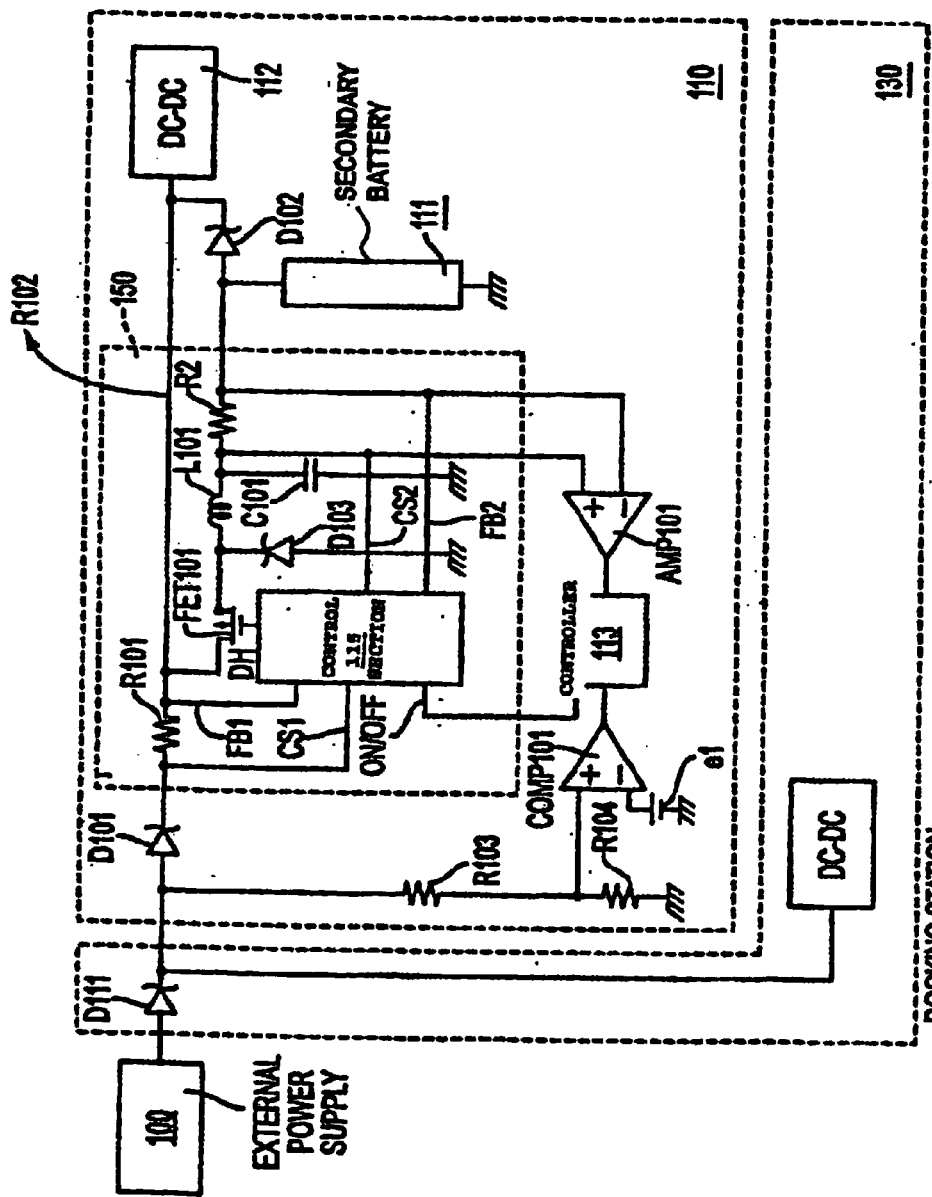
FIG. 7 is a diagram illustrating a structure of a related art power supply wherein a docking station is used.

In the power supply of this embodiment, an input current notification line and an input power notification line to the control section 215 from the microcomputer 213 are newly added in comparison with the related art power supply circuit illustrated in FIG. 7. An input current notification line to the microcomputer 213 from the control section 215 and the MASK signal line are also added. Content and procedure for these signals will be explained later.

Microcomputer 213 is a micro-controller to control the power supply, and is connected with power supply 250. The microcomputer 213 can detect MASK1 signal and MASK2 signal from the power supply 250 and an input current value to the power supply 250.

Figure 12:
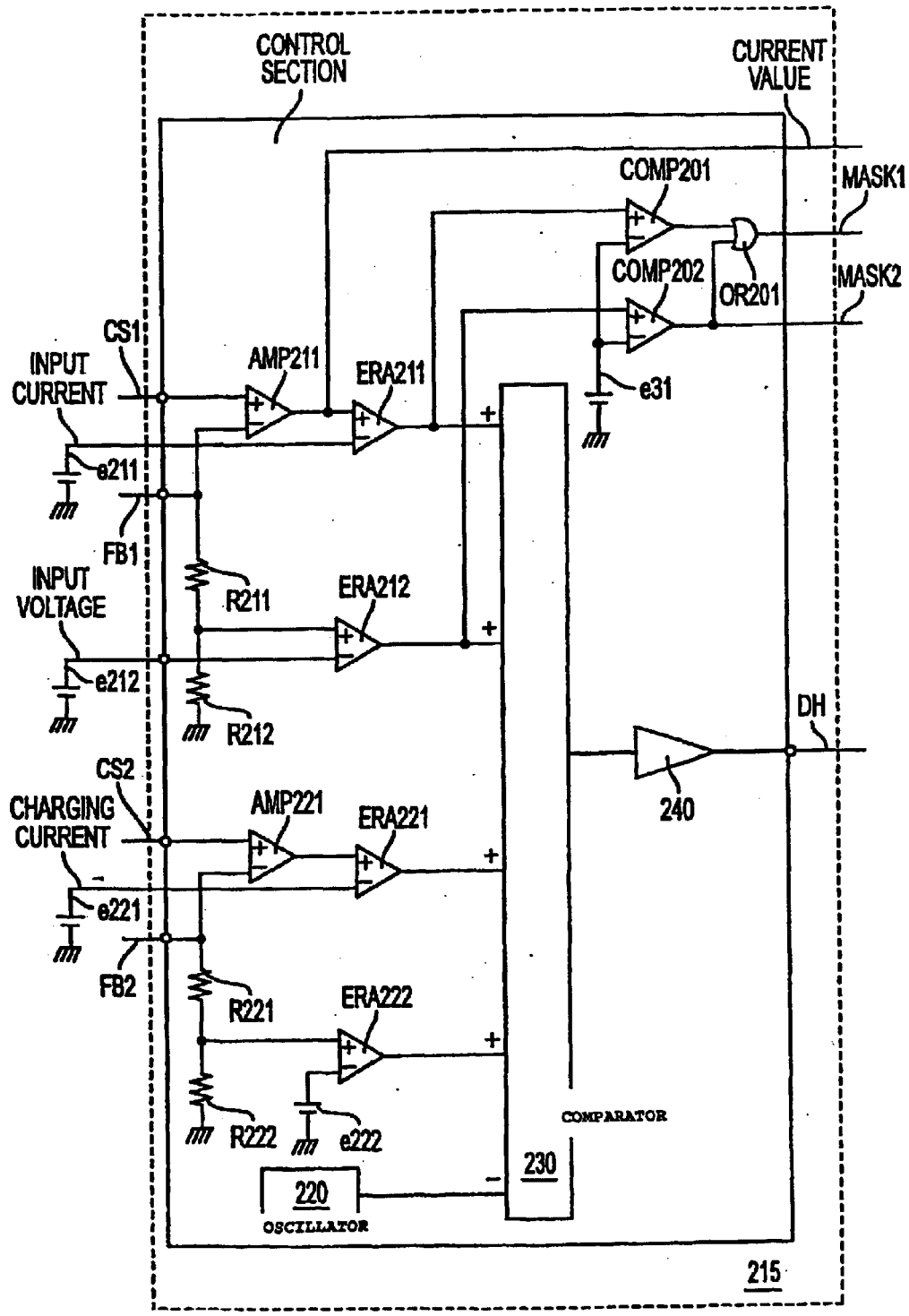
FIG. 12 is a diagram illustrating a power supply control circuit in accordance with an embodiment of the present invention.

FIG. 12 is a diagram illustrating the control section 215 of the power supply circuit of FIG. 11. The control section 215 comprises a reference voltage source e211 for setting the upper limit of the current value flowing into the sense resistor R210 and a reference voltage source e221 for monitoring the voltage when the external power supply droops or drops the voltage under the overload condition.

R211 and R212 are divided resistors for measuring the voltage value of the external power supply 100 inputted to the power supply 250. e212 is the reference voltage for comparing the input voltage value of the power supply 250. ERA212 amplifies a difference between the input voltage value of the power supply 250 obtained with the divided resistors R211 and R212 and the reference voltage value e212 and then outputs such difference to the PWM comparator. When the input voltage value of power supply 250 is lowered, difference from the reference voltage value e212 is reduced. Thereby, the error amplifier ERA12 outputs a low level to reduce the charging power. Accordingly, a load of the external power supply 100 is reduced. When the input voltage value of power supply 250 becomes high, difference from the reference voltage value e212 becomes large. Thereby, the error amplifier ERA212 outputs a high level.

This voltage comparator COMP201 is the circuit to compare the output voltage value of the error amplifier ERA211 for measuring a current to measure an output current value of the external power supply 100 with the reference voltage value e31. The reference voltage value e23 is identical to the maximum value of the output voltage value of the triangular wave oscillating circuit 220. Similarly, the voltage comparator COMP202 is the circuit to compare the output voltage value of the error amplifier ERA12 for measuring a voltage to measure the output voltage value of the external power supply 100.

Output signals of the voltage comparators COMP201 and COMP202 are OR'ed with a logical sum circuit OR201. The MASK1 signal becomes high level when the voltage comparator COMP201 or COMP202 outputs a high level. The MASK1 signal becomes a low level when both voltage comparators COMP202 and COMP202 output low level.

Moreover, an output of the error amplifier ERA211 for current measurement to measure the output current value of the external power supply is outputted to the outside of the control section 215. Therefore, the microcomputer 213 can read the output current value of the external power supply.

The PWM comparator is a voltage comparator, as explained above, including one inverting input and a plurality of non-inverting inputs. The PWM comparator compares the lowest voltage value among a plurality of inverting inputs with the voltage value of the inverted input. This PWM comparator is a voltage pulse width converter for controlling the ON time of an output of the power supply depending on the input voltage value.

An output of the triangular wave oscillator is inputted to the inverting input of the PWM comparator. To the non-inverting inputs of the PWM comparator, outputs of the error amplifiers ERA221, ERA222, ERA211 and ERA212 are inputted. Therefore, the drive circuit 240 is driven during the period where the triangular wave voltage from the triangular oscillator 220 is lower than any voltage value of the output voltage values of the error amplifiers ERA221, ERA222, ERA211 and ERA212. The drive circuit 240 drives the main switching FET1 (FIG. 11).

Moreover, the driving of the drive circuit 240 stops during the period where the voltage value of the triangular wave from the triangular wave oscillator 220 is higher than any voltage value of the error amplifiers ERA221, ERA222, ERA211 and ERA212. The drive circuit 240 turns OFF the main switching FET1.

The input voltage value is measured with the resistors R221, R222. The measured input voltage value is then amplified with the error amplifier ERA222 and is then inputted to the PWM comparator. To the PWM comparator, the triangular wave from the triangular wave oscillator 220 is applied. When the output voltage value of the error amplifier ERA222 becomes large, an output pulse width of the PWM comparator also becomes large. When the output voltage value of the error amplifier ERA212 becomes smaller, an output pulse width of the PWM comparator also becomes small. Therefore, when the input voltage value becomes small, the difference from the reference voltage value e22 becomes small. An output voltage of the error amplifier ERA222 also becomes small. Therefore, the output pulse width of the PWM comparator becomes wide. When the input voltage value becomes large, the difference from the reference voltage value e222 becomes large. An output voltage of the error amplifier ERA222 also becomes high. Therefore, the output pulse width of the PWM comparator becomes narrow.

As explained above, the power supply of the PWM control system enables control of the output voltage by controlling the ON/OFF ratio (ratio of Ton and Toff) of the main switching FET1.

Figure 16:
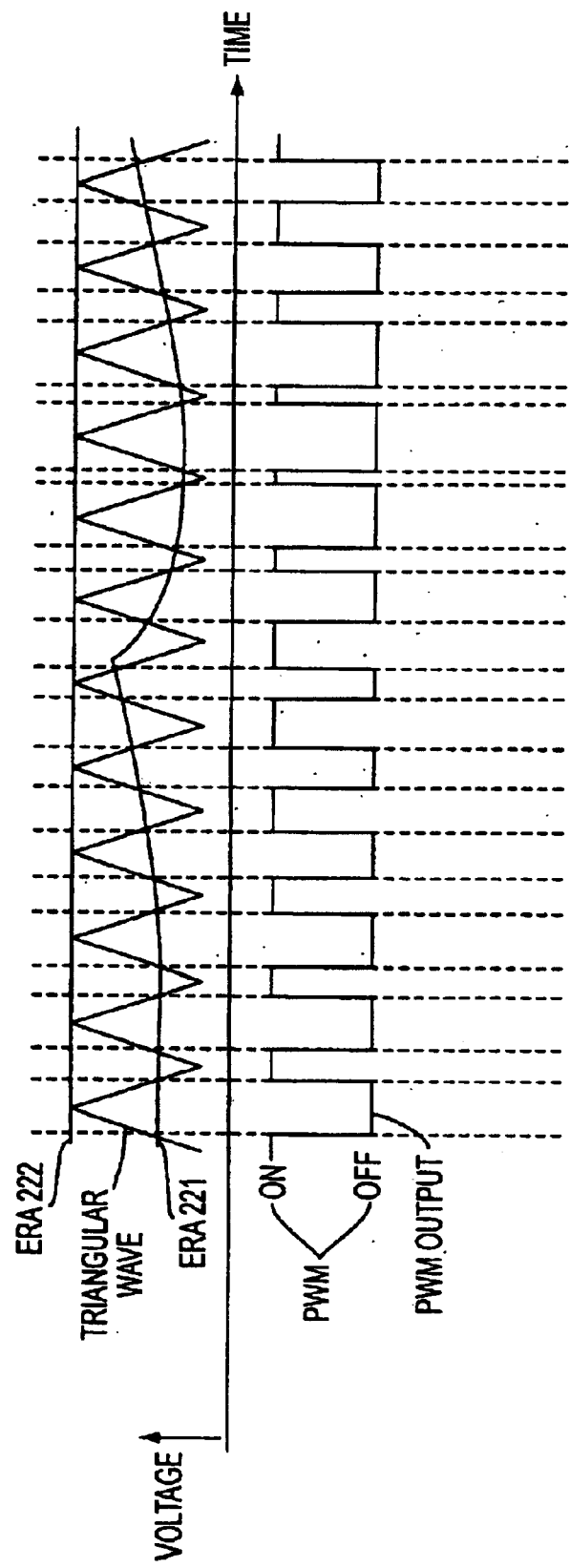
FIG. 16 is a graph illustrating voltage control of a power supply control circuit in accordance with an embodiment of the present invention.

FIG. 16 is a graph illustrating the profile of the above described control for this power supply. The horizontal axis plots the time, while the vertical axis plots the voltage. In this figure, the output voltage value of the error amplifier ERA221 is always lower than the output voltage value of the error amplifier ERA222. Accordingly, when an output of the PWM comparator is considered, it is enough to consider the relationship between the output voltage of the error amplifier ERA222 and the voltage value of the triangular wave. After all, the PWM comparator becomes ON when the output voltage value of the error amplifier ERA222 is higher than the voltage value of triangular wave or becomes OFF in other cases. As explained above, the PWM comparator adjusts the output voltage by adjusting the output time.

Moreover, a total current of the current consumed in the load side of the electronic device and a current consumed in the power supply flows into the sense resistor R211 for measuring the consumed current value of the electronic device. Voltage drop generated by the current flowing through the sense resistor R211 is converted to a voltage with the amplifier AMP211. The voltage value is amplified with the error amplifier ERA211 and is then inputted to the PWM comparator. To the PWM comparator, the triangular wave is applied from the triangular wave oscillator and when the output voltage value of the error amplifier ERA211 becomes large, the output pulse width of the PWM comparator also becomes large. When the output voltage value of the error amplifier ERA211 becomes small, the output pulse width of the PWM comparator also becomes small.

Therefore, a total input current of the current consumed in the load side of the electronic device and the current consumed in the charger is rather small, and the potential difference across the sense resistor R101 becomes small. Thereby, the difference between the potential difference across the sense resistor R101 and the reference voltage value ell becomes large. The output voltage of the error amplifier ERA211 becomes high. Therefore, the output pulse width of the PWM comparator becomes wide.

When an input current as a sum of the current consumed in the load side of the electronic device and the current consumed in the charger becomes large, the voltage drop by the sense resistor R221 becomes large. Thereby, the difference between the voltage drop generated with the sense resistor R221 and the reference voltage value e211 becomes small. Here, the output voltage of the error amplifier ERA211 also becomes lower. Thereby, the output pulse width of the PWM comparator becomes narrow.

Figure 17:
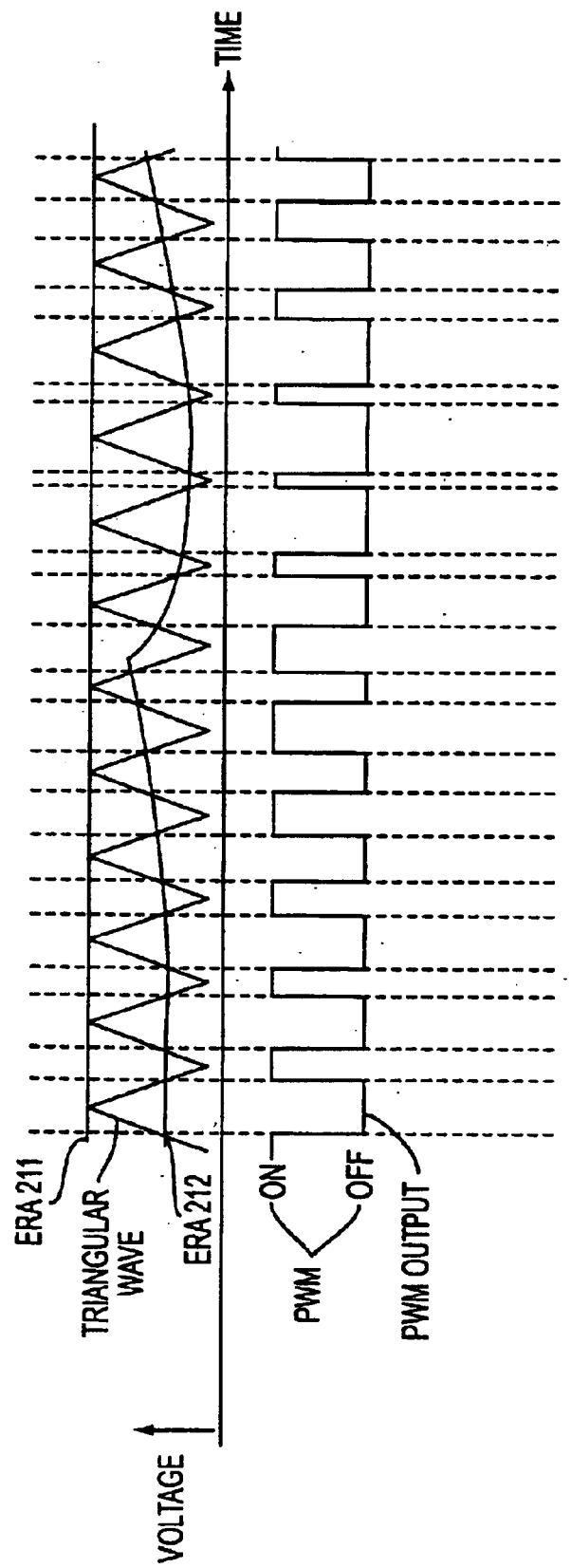
FIG. 17 is a graph illustrating current control of a power supply control circuit in accordance with an embodiment of the present invention.
Figure 18:
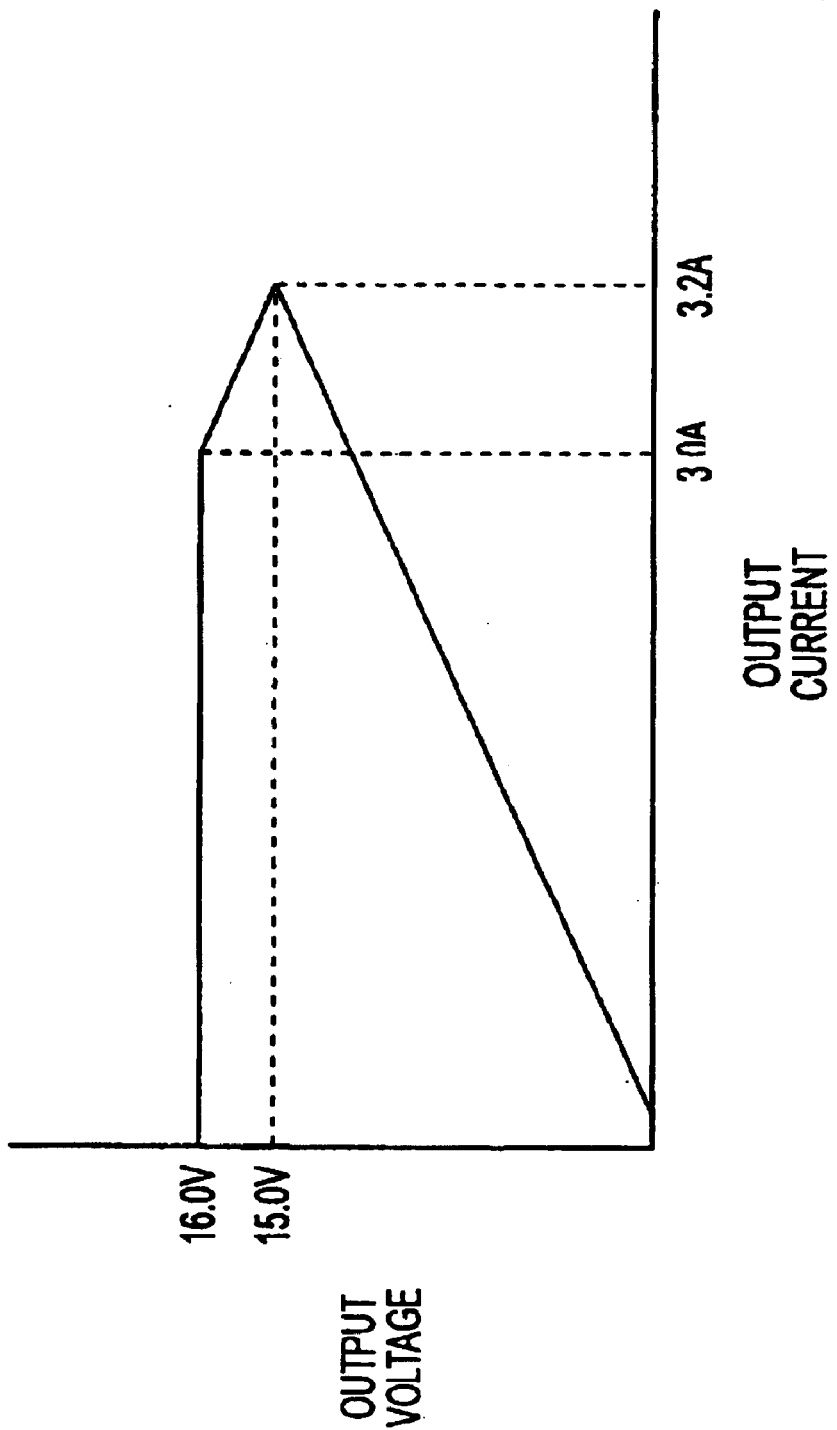
FIG. 18 is a graph illustrating output characteristics of an external power supply in lower performance.

FIG. 17 illustrates how the PWM control system regulates output current by controlling the ON/OFF ratio (Ton to Toff ratio) of the main switching FET1. In the power supply control circuit operating as explained above, when a load of the electronic device is rather light or when an output of the external power supply is sufficiently large that is enough as the charging power of the secondary battery, the PWM comparator is controlled with either the output voltage value of the error amplifier ERA221 or the output voltage value of the error amplifier ERA222 to control the output of the charger. The output voltage value of the error amplifier ERA211 for sensing the input of the external power supply and the output voltage value of the error amplifier ERA212 do not take part in the control.

As a result, the output voltage value of the error amplifier ERA211 and the output voltage value of the error amplifier ERA212 become larger than the maximum value of the voltage value of the triangular wave and the voltage comparators COMP201 and COMP202 output low levels. Therefore, the MASK1 and MASK2 signals are kept in the low level, indicating that the output of the external power supply is sufficient.

On the other hand, when the power consumption in the electronic device side and thereby a current flowing into the sense resistor R101 for measuring current dissipation value also increases and reaches the preset current value (set by the reference voltage source e211), the voltage drop generated with the sense resistor R211 becomes large. The difference between the voltage drop generated with the sense resistor R211 and the reference voltage value e211 becomes small and the output voltage of the error amplifier ERA211 becomes lower. When the output voltage of the error amplifier ERA211 becomes lower, the output pulse width of the PWM comparator becomes narrow. If this condition occurs, the output voltage value of the error amplifier ERA211 becomes lower than the reference voltage value e23. As a result, the output of the voltage comparator COMP201 becomes high level. An OR circuit 201 outputs the high level.

On the other hand, since the output voltage of the external power supply does not become lower, it does not take part in the control of output of the power supply. The output voltage value of the error amplifier ERA212 is high and is larger than the maximum value of the voltage value of the triangular wave. Therefore, COMP202 outputs a low level. As a result, the MASK1 signal becomes high level. The MASK2 signal stays in the low level. Therefore, it indicates that the charging current of the secondary battery is limited due to the limitation of the output current of the external power supply.

Next, in another exemplary embodiment, the load of the external power supply is equal to the total power of the power consumption of the docking station, power consumption of the electronic device and power consumption of the secondary battery. When the power consumption of the electronic device side increases under this condition, a current flowing into the sense resistor R212 to measure the current dissipation in the electronic device side also increases. However, a load current in the docking station side does not flow into the sense resistor R211.

As a result, the current value of the sense resistor R211 exceeds the capacity of the external power supply in some cases before such current value reaches the preset current value (set with the reference voltage source e211). In this case, the external power supply becomes overloaded. In this case, since the external power supply drops the output voltage and therefore the output voltage of the error amplifier ERA212 becomes lower and the output pulse width of the PWM comparator becomes narrow. Under the condition that the PWM comparator is controlled with the output voltage value of the error amplifier ERA212, the output voltage value of the error amplifier ERA212 becomes lower than the reference voltage value e231. As a result, the output of the voltage comparator COMP202 becomes high level.

However, a current value flowing into the sense resistor R211 does not reach the preset current value. The output voltage value of the error amplifier ERA211 is kept higher than the reference voltage e31. The voltage comparator COMP201 outputs a low level. Therefore, although the MASK1 signal is kept in the low level, the MASK2 signal becomes high level. This condition indicates that the charging current of the secondary battery is limited with limitation of the output voltage of the external power supply.

Thus, an output voltage of the charger can be controlled for the purpose that the output voltage of the external power supply does not drop. The power supply control circuit is capable of dynamically controlling the charging current depending on the capacity of the external power supply.

It is possible to know that the charging current of the secondary battery is limited with limitation of output capacity of the external power supply from the MASK1 signal and MASK2 signal. Moreover, it is also possible to identify that output capacity of the external power supply is limited with the output current or with the output voltage.

Moreover, the output current of the external power supply can be detected from an output of the voltage amplifier AMP211, since it flows into the sense resistor R211. The upper limit value of the current flowing into the sense resistor R211 can be set with the reference voltage source e211. In addition, the upper limit value of the charging current of the secondary battery built in the electronic device can also be set with the reference voltage source e212. The monitoring voltage value when the external power supply droops or drops the voltage under the overload condition can also be set with the reference voltage source e221.

Although preferred embodiments of the present invention have been shown and described, it will be appreciated by those skilled in the art that changes may be made in these embodiments without departing from the principle and spirit of the invention, the scope of which is defined in the appended claims and their equivalents.

What is claimed is:

1. A power supply control method, comprising:

outputting a first output power value in which an input current value becomes a first value for a first time period by controlling the input current value so that an output power is maintained as the first output power value;

outputting a second output power value that is smaller than the first output power value for a second time period by controlling the input current value so that the output power is maintained as the second output power value;

measuring the passage of the first time period with a first timer; and measuring the passage of the second time period with a second timer after the first timer measures the first time period, wherein the first time period does not exceed two hours, and the second output power value is 0.8 or less of the first output power value.

2. The power supply control method as claimed in claim 1, further comprising:

determining, in the event where an output power value does not satisfy the respective first or second value, whether the cause is in an input voltage or input current.

* * * * *